US007978842B2

(12) United States Patent
Cooke

(10) Patent No.: US 7,978,842 B2
(45) Date of Patent: Jul. 12, 2011

(54) METHOD AND SYSTEM FOR MANAGING BANDWIDTH IN COMMUNICATION NETWORKS

(75) Inventor: Jawhny Cooke, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1253 days.

(21) Appl. No.: 11/186,208

(22) Filed: Jul. 20, 2005

(65) Prior Publication Data
US 2006/0251234 A1 Nov. 9, 2006

Related U.S. Application Data

(63) Continuation-in-part of application No. 11/094,888, filed on Mar. 30, 2005.

(51) Int. Cl.
*H04M 7/00* (2006.01)
(52) U.S. Cl. ......... 379/221.07; 379/112.05; 379/114.07; 379/93.31; 379/93.32; 379/93.33
(58) Field of Classification Search .................. 370/230, 370/329, 486, 395.21; 709/226
See application file for complete search history.

(56) References Cited

U.S. PATENT DOCUMENTS

| | | | |
|---|---|---|---|
| 6,363,434 B1 | 3/2002 | Eytchison | |
| 6,792,323 B2 | 9/2004 | Krzyzanowski et al. | |
| 6,831,899 B1 * | 12/2004 | Roy | 370/260 |
| 7,035,270 B2 | 4/2006 | Moore et al. | |
| 7,430,187 B2 * | 9/2008 | Holt et al. | 370/329 |
| 7,512,683 B2 * | 3/2009 | Anschutz et al. | 709/226 |
| 2004/0017825 A1 | 1/2004 | Stanwood et al. | |
| 2005/0002335 A1 * | 1/2005 | Adamczyk et al. | 370/230 |
| 2005/0002392 A1 | 1/2005 | Vijeh et al. | |
| 2005/0015494 A1 * | 1/2005 | Adamczyk et al. | 709/226 |
| 2006/0028981 A1 * | 2/2006 | Wright | 370/229 |
| 2006/0034300 A1 * | 2/2006 | Barzegar et al. | 370/401 |
| 2006/0039381 A1 * | 2/2006 | Anschutz et al. | 370/395.21 |
| 2006/0126595 A1 * | 6/2006 | Dahm et al. | 370/352 |
| 2006/0215650 A1 * | 9/2006 | Wollmershauser et al. | 370/389 |
| 2007/0105549 A1 * | 5/2007 | Suda et al. | 455/426.2 |

OTHER PUBLICATIONS

Technical Report DSL Forum TR-094 entitled: "Multi-Service Delivery Framework for Home Networks" dated Aug. 2004.
Technical Report DSL Forum TR-064 entitled: "LAN-Side DSL CPE Configuration" dated May 2004.
PacketCable Dynamic Quality of Service Specification, 1999-2005b by Cable Television Labs., Inc., 103 pages.
Technical Report DSL Forum TR-094 entitled "Multi-Service Delivery Framework for Home Networks" dated Aug. 2004.
Technical Report DSL Forum TR-064 entitled "LAN-Side DSL CPE Configuration" dated May 2004.

* cited by examiner

*Primary Examiner* — Curtis Kuntz
*Assistant Examiner* — Joseph J Nguyen
(74) *Attorney, Agent, or Firm* — Hickman Palermo Truong & Becker LLP

(57) ABSTRACT

A method, system, apparatus and machine-readable medium for managing bandwidth in a communication network via a Turbo Button Service (TBS) are provided. The communication network includes a Regional/Access Network (RAN). The bandwidth management includes varying the bandwidth according to the usage requirement. The method comprises invoking a request for the TBS. The invocation of the request results in a change in a default bandwidth associated with a user's access connection.

12 Claims, 7 Drawing Sheets

METHOD AND SYSTEM FOR MANAGING BANDWIDTH IN COMMUNICATION NETWORKS

CLAIM OF PRIORITY

This application is a continuation-in-part of, and claims priority from, the following application which is hereby incorporated by reference as if it is set forth in full in this application for all purposes: U.S. patent application Ser. No. 11/094,888 entitled "Local Provisioning of Bandwidth and Other Network Resources," filed on 30 Mar. 2005.

BACKGROUND OF THE INVENTION

1. Field of Invention

Embodiments of the invention relate in general to communication networks. More specifically, the embodiments of the invention relate to methods and systems for managing bandwidth in the communication networks.

2. Description of the Background Art

Today many homes are provided with relatively high-speed broadband Internet access. Some types of activities and services that are provided to a home include web page viewing, file transfers, voice communication (e.g., Voice over Internet Protocol (VoIP)), Video on Demand (VoD) or near Video on demand (nVoD) including streaming audio and video, online gaming, etc. These are loosely classified as three types of data—Voice, Video and Integrated Data (VVID)—with online gaming sometimes discussed as a fourth type.

Residential Digital Subscriber Line (DSL) subscribers are faced with the issue of matching their application bandwidth needs with the entry-level bandwidth provided by DSL service provider. Some services, such as VoIP require a guaranteed amount of bandwidth or the service's performance may become unacceptable. For example, if a VoIP phone device cannot transmit or receive its data fast enough, a person in a phone conversation can experience interruptions, degradation of sound quality, or other unacceptable effects. On the other hand, a service such as downloading a file in a background, or batch mode can often tolerate a slowdown or short suspension of the service since the user is not paying immediate attention to the operation of the service.

In most of the cases the need for a higher bandwidth is temporary. Therefore, a service level upgrade is not justifiable as the investment is very high.

TR-058 allows Application Service Providers (ASPs) to offer their applications at speeds independent of traditional dial up Internet access. Therefore, ASPs can provide large amount of bandwidth to each subscriber. However, it may lead to bandwidth exhaust on the Digital Subscriber Line Access Multiplexer (DSLAM) uplink. In addition, many applications, for example, content download such as large Windows XP service packs or Multicast Video Content, and on-line gaming might not be offered by the ASP or might not have considered adding value using TR-058's "big pipe" approach.

DETAILED DESCRIPTION OF EMBODIMENTS OF THE INVENTION

Figure 1:
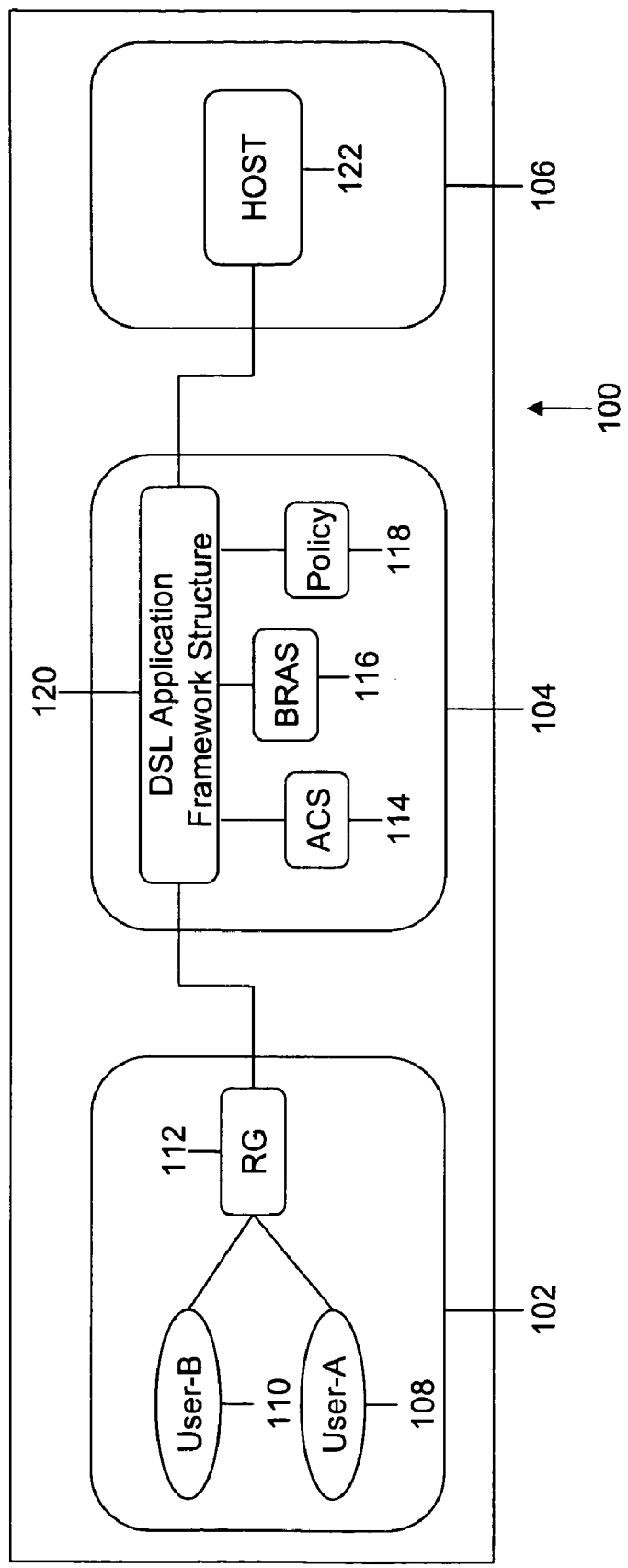
FIG. 1 illustrates a communication network, in accordance with an exemplary embodiment of the present invention.

Various embodiments of the present invention provide a method, a system, an apparatus and a computer-readable medium for managing bandwidth in a communication network. Communication network includes a Regional/Access Network (RAN). In various embodiments of the invention, a Turbo Button Service (TBS) is used to manage the bandwidth. The bandwidth management includes varying the bandwidth according to usage requirement. Various embodiments of the present invention provide the TBS for higher access speeds on demand. In an exemplary embodiment of the invention, the method includes invoking a request for the TBS. The invocation of the request results in a change in a default bandwidth capacity allowed to a user.

In various embodiments of the invention, the TBS can be a Persistent TBS (P-TBS) or a temporary TBS (T-TBS). In case of the P-TBS, subscription and invocation operations associated with usage of the TBS can be merged. This means that there is no logical separation between subscription and invocation operations. Therefore, the P-TSB can be invoked at or very soon after the subscription. The change made to the service profile of user is in-effect until the user unsubscribes. In an embodiment of the present invention, the "persistence" of the TBS is not related to the duration of a single Point-to-Point Protocol (PPP) session. Therefore, the increased bandwidth is carried across several sessions until the user revokes it.

In case of the T-TBS, the subscription and the invocation are completely separate operations. Therefore, the user has to subscribe to the TBS service in order to have a capability to invoke the T-TBS. Thus, for the T-TBS, a means must be established for the user to "push the turbo button", which may happen multiple times in one session. Each invocation of the T-TBS can last some prearranged time after which the service profile would revert to the default settings until the user invokes the TBS again. In various embodiments of the present invention, the T-TBS invocations may not require canceling since the service cancels itself after a fixed interval of time. In an embodiment of the invention, the T-TBS is revoked when application or service bandwidth requirement of the user is no longer needed, i.e., the user no longer requires the enhanced bandwidth.

The various embodiments of the present invention are described herein in the context of Digital Subscriber Line (DSL) technology for purposes of illustration. It will be understood that the present invention is not limited to DSL technology. Other communication technologies and/or network configurations that may also be used in other embodiments of the present invention include, but are not limited to, Asynchronous Transfer Mode (ATM), frame relay, Hybrid Fiber Coax (HFC), wireless broadband, and/or Ethernet. In general, the various embodiments of the present invention encompass any technology and/or network configuration that are capable of carrying out operations described herein.

FIG. 1 illustrates a communication network 100, in accordance with an exemplary embodiment of the present invention. Communication network 100 includes a Customer Premises Network (CPN) 102, a Regional/Access Network (RAN) 104 and a service provider 106.

In various embodiments of the present invention, CPN 102 includes, for example, a user-A 108, a user-B 110 and a Residential Gateway (RG) 112.

RAN 104 facilitates a differentiated end-to-end data transport between service provider 106 and CPN 102. In various embodiments of the present invention, RAN 104 includes an Auto Configuration Server (ACS) 114, a Broadband Remote Access Server (BRAS) 116, a policy 118 and a DSL application framework structure 120.

ACS 114 is a data repository that allows RAN 104 to provide configuration information to RG 112. BRAS 116 is an aggregation point for subscriber traffic. BRAS 116 provides aggregation capabilities between RAN 104 and service provider 106. Examples of aggregation capabilities include, but are not limited to, PPP connection and ATM. Policy 118 is a set of rules to administer, manage, and control access to network resources.

In an embodiment of the present invention, RAN 104 also provides higher layer functions, such as Quality of Service (QoS) and content distribution. QoS may be provided by coupling traffic-engineering capabilities of RAN 104 with the capabilities of BRAS 116.

In various embodiments of the present invention, service provider 106 is at least one of a group including a Network Service Provider (NSP) and an Application Service Provider (ASP).

The NSP includes telecommunications companies, data carriers, wireless communications providers, Internet service providers, and cable television operators offering high-speed Internet access.

Example of the services offered by the ASP include, but are not limited to, gaming, Video on Demand (VoD), and access to Virtual Private Network (VPN) via IP Security (IPsec) or some other IP-tunneling method. Service provider 106 includes a host 122. Host 122 is an ASP host or a NSP host depending upon the type of service provider 106.

Figure 2:
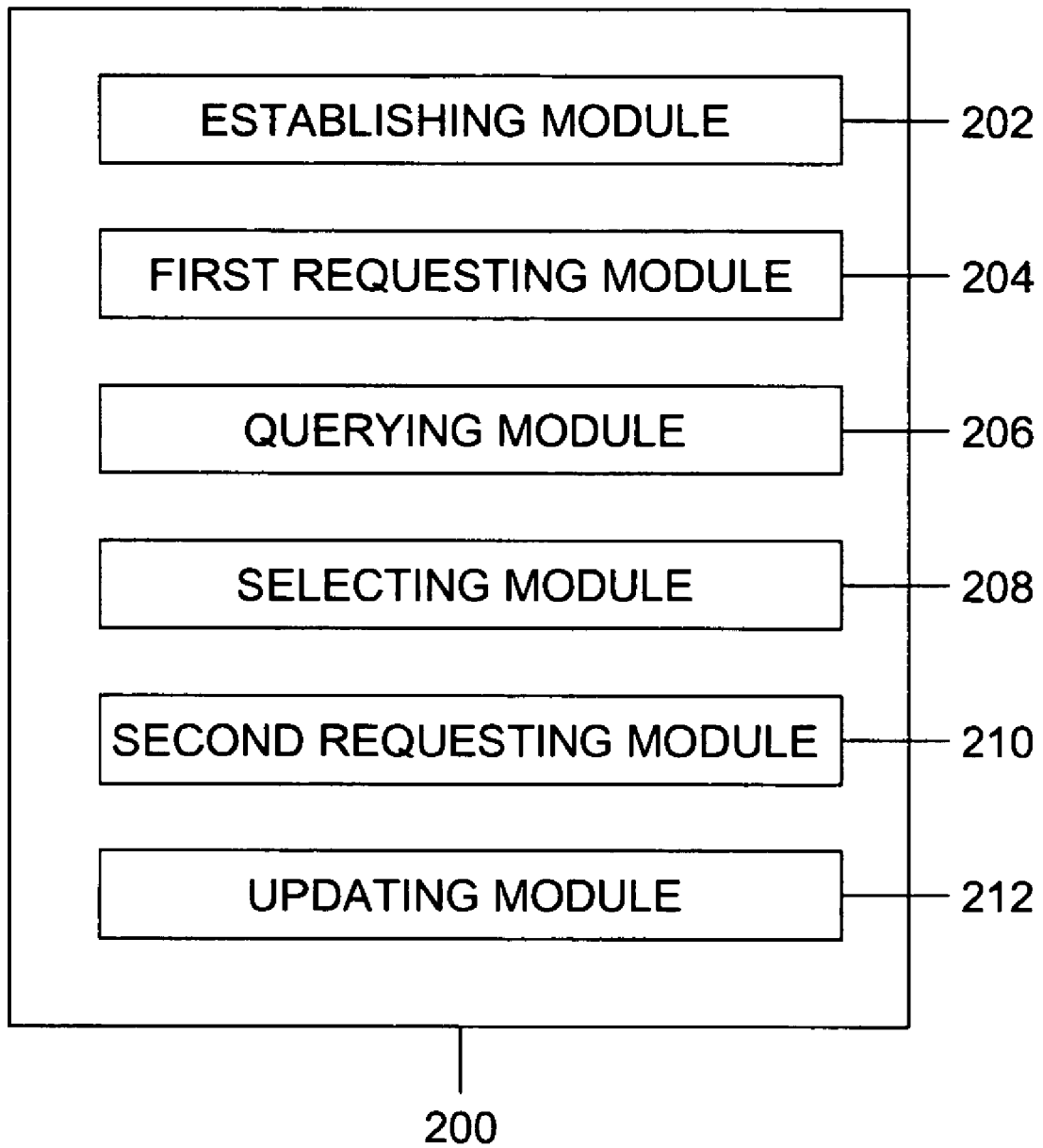
FIG. 2 illustrates a system for managing bandwidth in a communication network via a Turbo Button Service (TBS), in accordance with an exemplary embodiment of the present invention.

FIG. 2 illustrates a system 200 for managing bandwidth in a communication network, in accordance with an exemplary embodiment of the present invention. In various embodiments of the present invention, the bandwidth is managed via a TBS. In various embodiments of the present invention, the TBS can be the T-TBS or the P-TBS In various embodiments of the present invention, user-A 108 has to sign up for the TBS. In an embodiment of the present invention, new DSL users can sign up for the TBS at the time they subscribe to the DSL System 200 includes an establishing module 202, a first requesting module 204, a querying module 206, a selecting module 208, a second requesting module 210 and an updating module 212. In various embodiments of the invention, each of system elements of system 200 is implemented as software, hardware, firmware or their combination thereof.

In various embodiments of the present invention, service provider 106 offers the TBS. In an embodiment of the present invention, the TBS is offered by the NSP. In an embodiment of the invention, the TBS is offered at NSP website. In various embodiments of the present invention, host 122 authenticates itself with RAN 104 to be able to access user profiles for which the TBS is required. Users are able to utilize the TBS service only after being authenticated by host 122.

In an embodiment of the present invention, establishing module 202 establishes a PPP access session for user-A 108.

First requesting module 204 invokes a request for the TBS. In various embodiments of the present invention, the request for the TBS is invoked either by a user, for example, user-A 108 or by RG 112. In various embodiment of the invention, user-A 108 is offered a choice of ways to invoke the request for the TBS, for example, user-A 108 may invoke the request within a current DSL session or separately from the DSL session. In various embodiments of the present invention, user-A 108 can invoke the request separately from the DSL session by using either a phone and or a mass-distributed Compact Disc (CD). In an embodiment of the invention, user-A 108 invokes the request for the TBS while in the DSL session by clicking on an advertisement on a web page. The advertisement takes user-A 108 to a subscription page, wherein the subscription page is supported by service provider 106.

In an embodiment of the present invention, RG 112 is intelligent and/or preconfigured to inspect an IP service or an application requested by user-A 108 and the default bandwidth capacity allowed to user-A 108. RG 112 invokes the request for the TBS on the basis of a bandwidth required by the IP service or the application requested by user-A 108. In an embodiment of the invention, RG 112 invokes the request for the TBS if user-A 108 is facing bandwidth starvation. In an embodiment of the present invention, the TBS invoked by RG 112 is of the T-TBS type wherein the T-TBS cancels itself when application or service bandwidth requirement of user-A 108 is no longer needed.

After invocation of the request, querying module 206 queries RAN 104 for one or more options available for the user's access session connection. In various embodiments of the present invention, host 122 uses the response to the query to put together a set of one or more options. The options include the various bandwidth levels that can be allocated apart from the default bandwidth available. In various embodiments of the present invention, service provider 106 maps the available upgrades of the TBS to the options such as bandwidth categories or marketing categories. Examples of bandwidth categories include but are not limited to 384 k, 1.5 Mb, or 6 Mb speeds. Examples of marketing categories include but are not limited to Gold, Silver, and Bronze speed.

Selecting module 208 selects one of the options presented. In various embodiments of the present invention, the option can be selected either by user-A 108 or RG 112. In an embodiment of the present invention, RG 112 selects the option based on the bandwidth required by the IP service or the application requested by user-A 108. Second requesting module 210 requests RAN 104 to change the default bandwidth capacity allowed to user-A 108. This results in a change in the access bandwidth. The new bandwidth allocated to user-A 108 can be based on the option selected by selecting module 208. In various embodiments of the invention, second requesting module 210 is a part of host 122.

Updating module 212 pushes new policy to RG 112 and BRAS 116. The new policy supports the new bandwidth and hence a new turbo speed for Internet access. The new policy is based on the selected option. The new policy includes classifiers, rate limiters and priorities associated with the Internet access. In various embodiments of the invention, updating module 212 is a part of RAN 104.

Once the new policy is in place, the user is able to access the application or sites served by service provider 106 at the new turbo speed. In various embodiments of the present invention, all the users connected to the access session, i.e., other Personal Computer (PC) users on the household Local Area Network (LAN) enjoy the benefits of the TBS.

Figure 3:
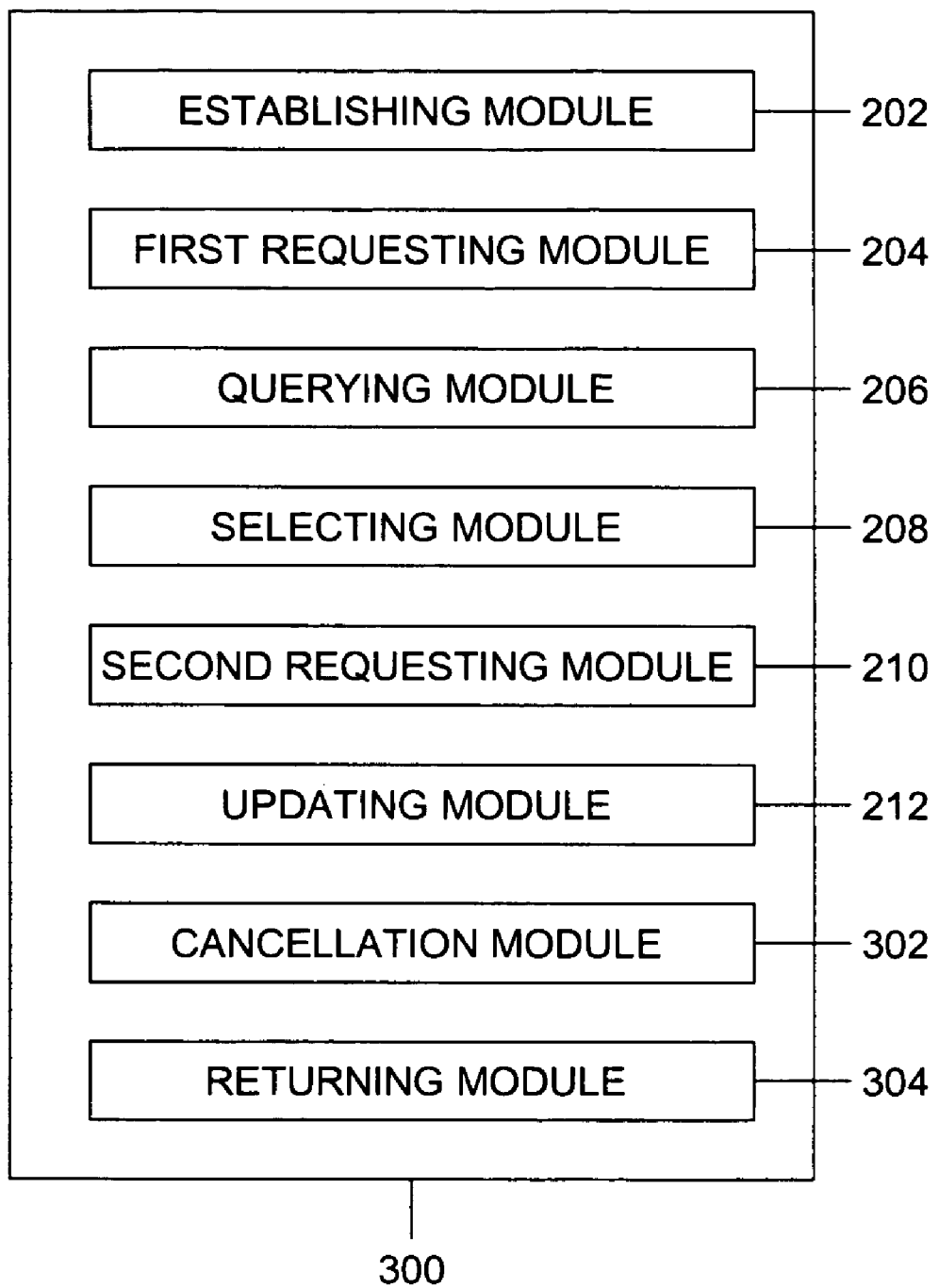
FIG. 3 illustrates a system for managing bandwidth in a communication network via the TBS, in accordance with another exemplary embodiment of the present invention.

In an embodiment of the present invention, system 200 further comprises a cancellation module 302 and a returning module 304 as shown in FIG. 3.

Cancellation module 302 initiates a cancellation of the invocation of the request for the TBS. In various embodiments of the present invention, the cancellation of the invocation of the request for the TBS is initiated either by user-A 108 or RG 112.

In a specific embodiment of the invention, it is possible to cancel the T-TBS subscription if the user is no longer interested in using the service. This is advantageous to the user if they are being billed at some fixed monthly rate even if there is no usage for a particular month.

Returning module 304 enables the change of the new bandwidth to the default bandwidth capacity allowed to user-A 108. Consequently, the network returns to its original state and the user's PPP session is no longer turboed.

In an embodiment of the present invention, user-A 108 is offered a choice of the TBS levels, for example Gold, Silver, and Bronze levels of service can be offered if multiple speed limits are achievable in the DSL network.

Time taken for the TBS to be manifested depends upon how the service is implemented. In an embodiment of the present invention, the time taken is negligible, i.e., near real-time invocation within a few seconds. An exemplary scenario when the time taken is negligible is for the case of the T-TBS. In another embodiment of the present invention, the time interval after which the effect of the TBS is manifested can be timed, i.e., the TBS is invoked at a prescribed time. The prescribed time may correspond to the time of usage of a particular application or service, for example, a gaming tournament or a "free weekend" for turbo access. In yet another embodiment of the present invention, the TBS may not be manifested after the invocation until the next-session. This means that the TBS is invoked only when the user starts the next session.

In an embodiment of the present invention, the TBS has a QoS support. In various embodiments of the present invention, user-A 108 is billed for the usage of the TBS. In turn, the DSL network provider bills service provider 106 for carrying traffic across RAN 104 at turbo speeds.

Figure 4:
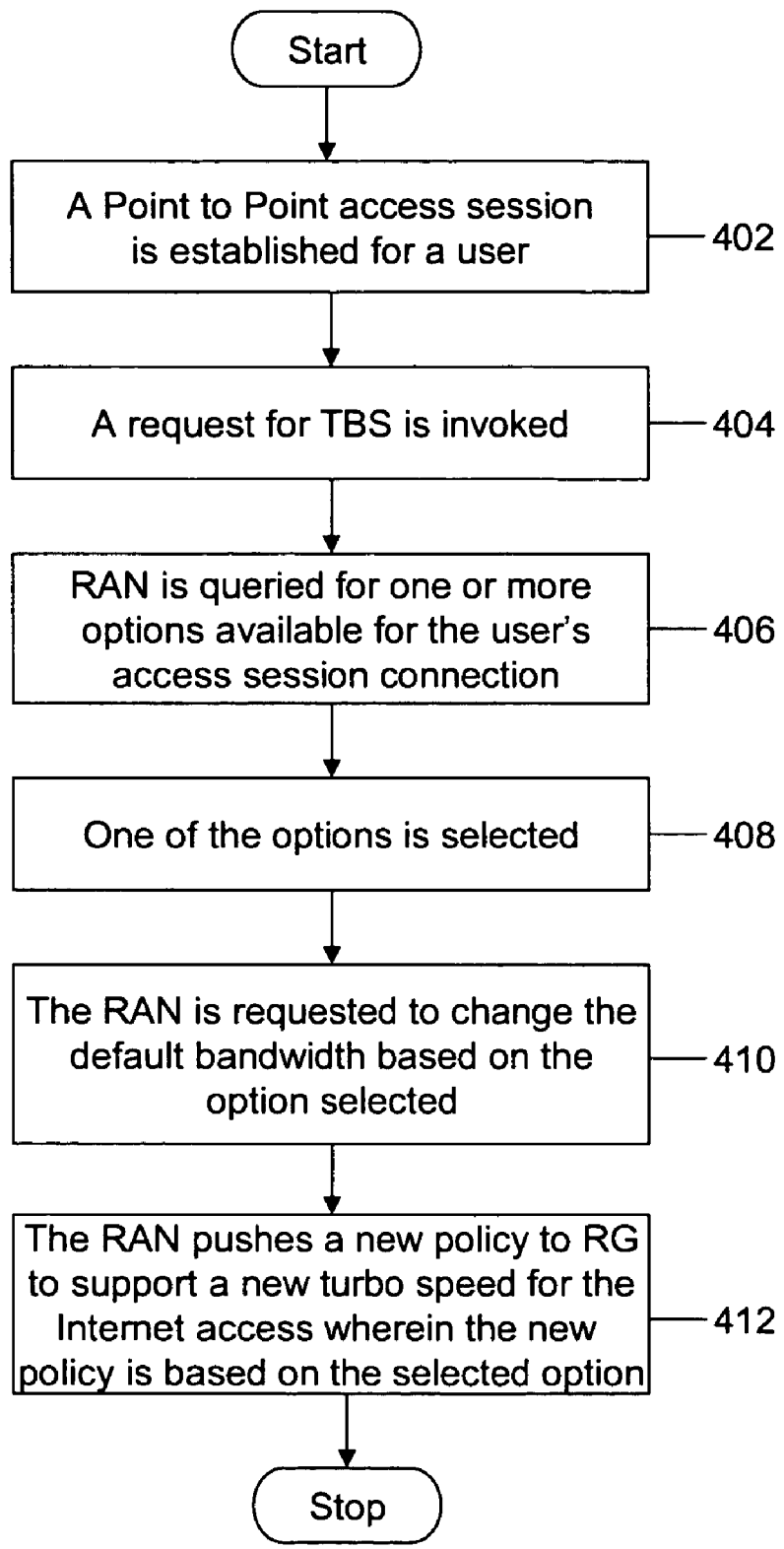
FIG. 4 is a flowchart depicting the requisite steps in a method for managing bandwidth in a communication network via the TBS, in accordance with an exemplary embodiment of the present invention.

FIG. 4 is a flowchart depicting the requisite steps in a method for managing bandwidth in a communication network, in accordance with an exemplary embodiment of the present invention. In various embodiments of the invention, the bandwidth is managed by using the TBS. In various embodiments of the invention, the TBS can be the T-TBS or the P-TBS. In various embodiments of the present invention, host of the service provider authenticates itself with RAN to be able to access user profiles for which the TBS is required. Users are able to utilize the TBS service only after being authenticated by the service provider host.

At step 402, a PPP access session is established for a user. At step 404, a request for the TBS is invoked. In various embodiments of the present invention, the request for the TBS can be invoked either by a user or the RG. In various embodiment of the invention, the user is offered a choice of ways to invoke the request for the TBS, for example, the user may invoke the request within a current DSL session or separately from the DSL session. In various embodiments of the present invention, the user can invoke the request separately from the DSL session by using either a phone or a mass-distributed CD. In an embodiment of the present invention, the user invokes the request for the TBS while in the DSL session by clicking on an advertisement on a web page. The advertisement takes the user to a subscription page wherein the subscription page is supported by the service provider.

In an embodiment of the present invention, the RG is intelligent and/or preconfigured to inspect an IP service or an application requested by the user and the default bandwidth capacity allowed to the user. The RG invokes the request for the TBS on the basis of the bandwidth required by the IP service or the application requested by the user. In an embodiment of the present invention, the RG invokes the request for the TBS if the user is facing bandwidth starvation.

At step 406, the service provider host queries the RAN for one or more options available for the user's access session connection. In various embodiments of the present invention, the service provider host uses the response to the query to put together a set of one or more options.

At step 408, one of the options is selected. In various embodiments of the present invention, the option is selected by either the user or the RG. In an embodiment of the present invention, the RG selects option based on the bandwidth required by the IP service or the application requested by the user. At step 410, the service provider requests the RAN to change the default bandwidth allowed to the user. In various embodiments of the present invention, the change in the bandwidth is completed within a few seconds after the end user pushes the turbo button. The new bandwidth allocated to the user is based on the selected option.

At step 412, RAN pushes a new policy to the RG and the BRAS. The new policy supports the new turbo speed for Internet access and is based on the selected option. Once the new policy is in place, the user is able to enjoy turbo speed access to the application or sites served by the service provider. In various embodiments of the present invention, all users connected to the access session, i.e., other Personal Computer (PC) users on the household Local Area Network (LAN) enjoy the benefits of the TBS.

In various embodiments of the present invention, the invocation of the request for the TBS may be cancelled.

Figure 5:
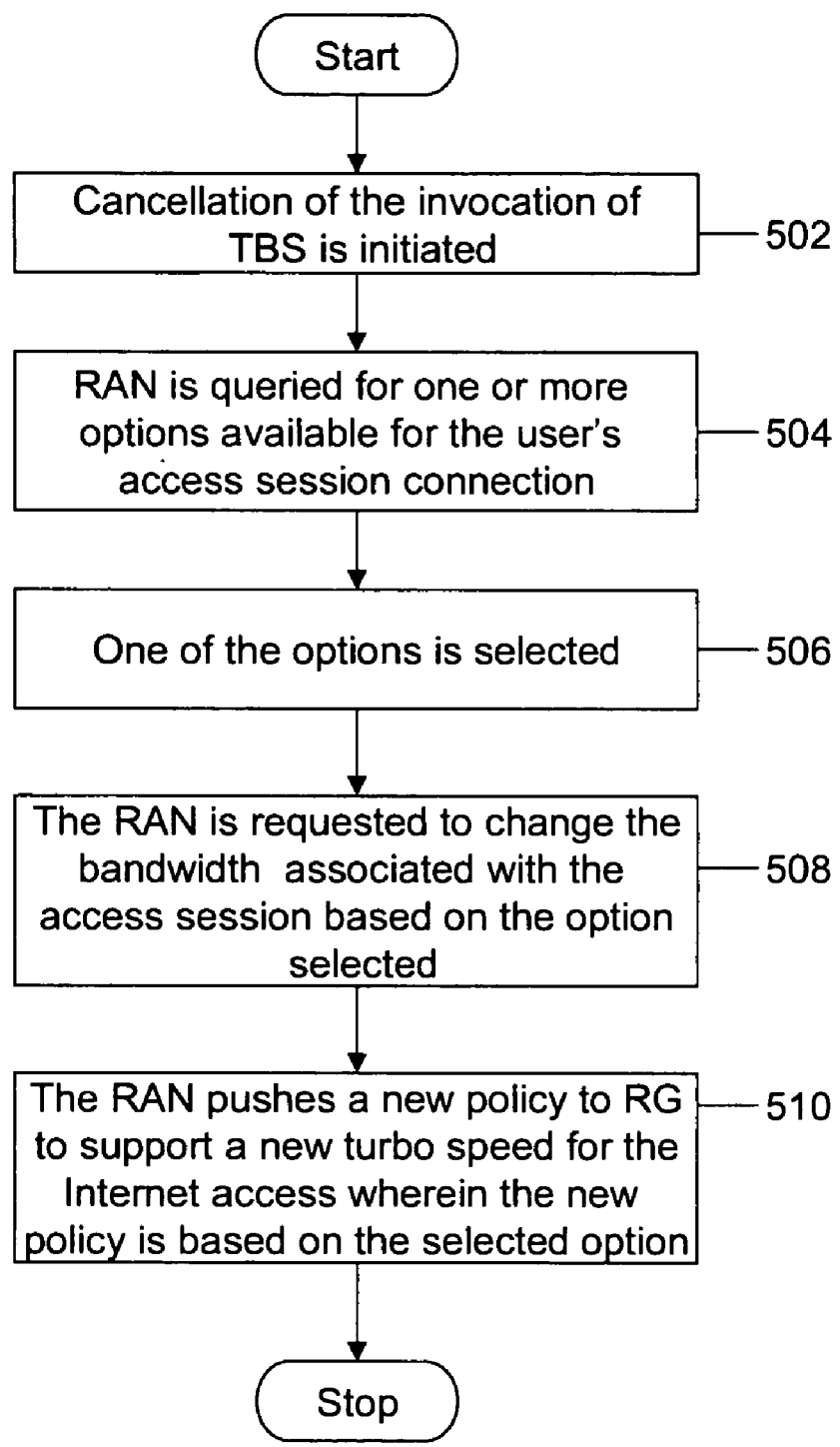
FIG. 5 is a flowchart depicting the requisite steps in a method for cancellation of the TBS invocation, in accordance with an exemplary embodiment of the present invention.

FIG. 5 is a flowchart depicting the requisite steps in a method for cancellation of the TBS invocation, in accordance with an exemplary embodiment of the present invention. In an embodiment the present invention, the cancellation is initiated automatically after a predetermined time is over. In an embodiment of the present invention, an enhancement in the bandwidth lasts until the user's application or service bandwidth requirement is no longer needed.

At step 502, a cancellation of the invocation of the request for the TBS is initiated. In an embodiment of the present invention, a user initiates cancellation. In an embodiment of the present invention the RG initiates the cancellation if the user's application or service bandwidth requirement is no longer needed.

In a specific embodiment of the invention, the T-TBS invocation may also be canceled if the user is no longer interested in the service.

At step 504, the service provider host queries the RAN for one or more options available for the user's access session connection. In various embodiments of the present invention, the service provider host uses the response to the query to put together a set of one or more options.

At step 506, one of the options is selected. In various embodiments of the present invention, either the user or the RG selects the option. At step 508, the service provider requests the RAN to change the session bandwidth to the default bandwidth capacity allocated to the user.

At step 510, the bandwidth is set to the default bandwidth. RAN subsequently pushes a new policy to the RG and the BRAS. The new policy supports the default turbo speed for Internet access and is based on the selected option.

Figure 6:
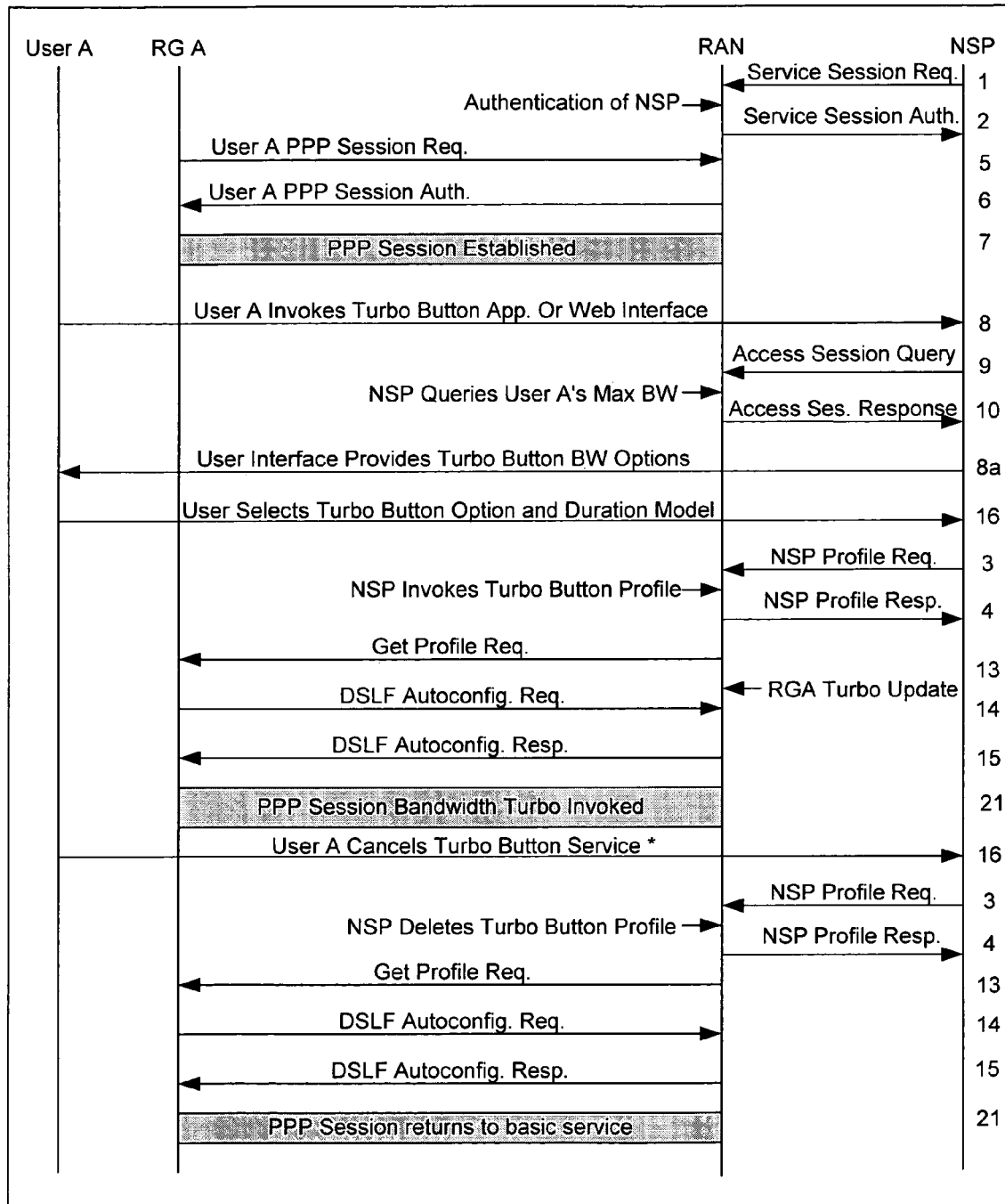
FIG. 6 is an event diagram that illustrates sequence of events depicted in FIG. 4 and FIG. 5 in accordance with an exemplary embodiment of the invention.

FIG. 6 is an event diagram that illustrates sequence of events of FIG. 4 in accordance with an exemplary embodiment of the invention. FIG. 6 shows the sequence of events happening in case where the request for the TBS is invoked by the user A. The service is offered by a NSP called "myNSP.com". For simplicity, the details of the RAN are not shown.

Figure 7:
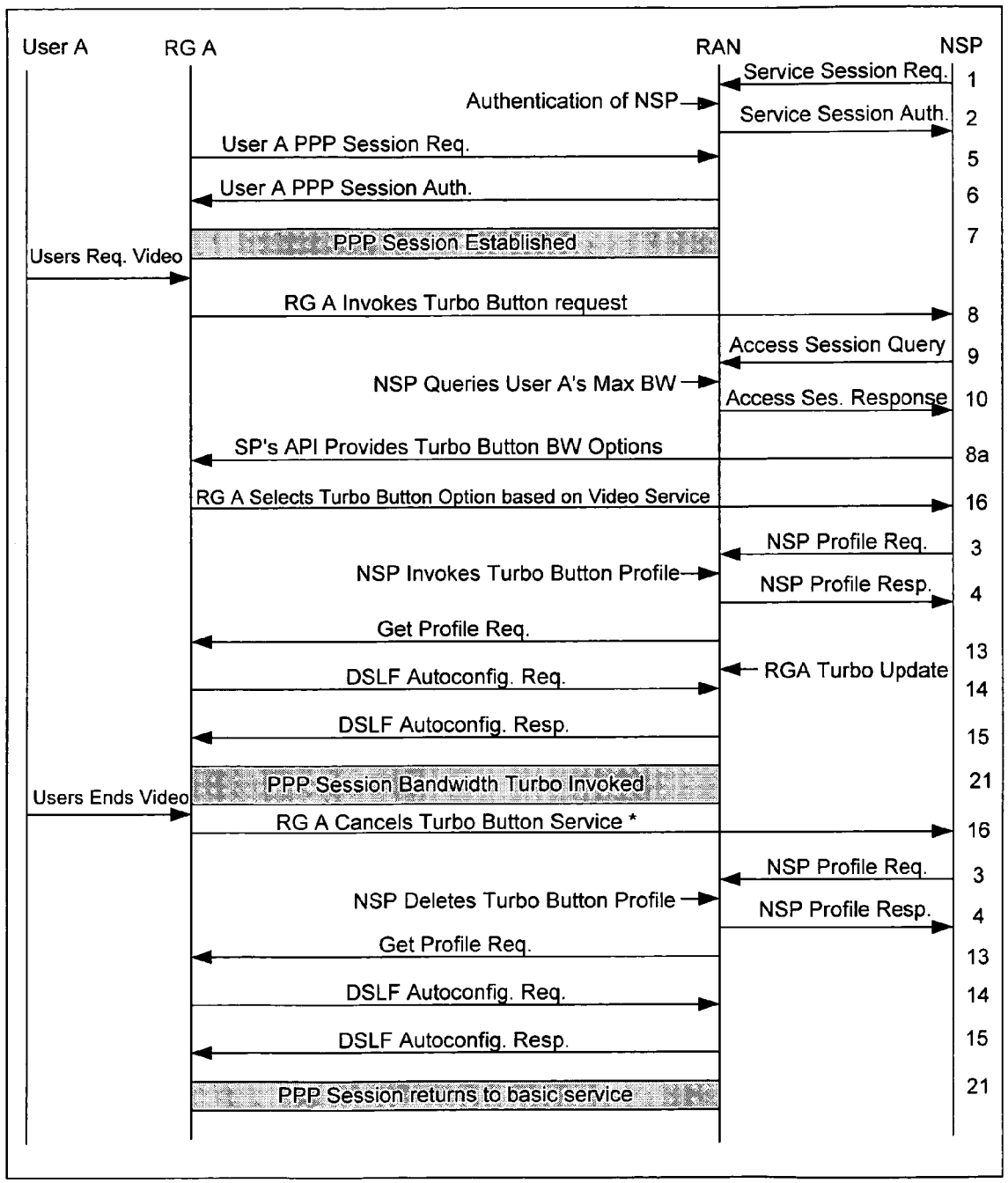
FIG. 7 is an event diagram that illustrates sequence of events depicted in FIG. 4 and FIG. 6 in accordance with another exemplary embodiment of the invention.

FIG. 7 is an event diagram that illustrates sequence of events of FIG. 4 in accordance with another exemplary embodiment of the invention. FIG. 7 shows the sequence of events happening in case where the request for the TBS is invoked by the RG on behalf of the user A. The service is offered by a NSP called "myNSP.com". For simplicity, the details of the RAN are not shown.

Embodiments of the present invention have the advantage that they allow the bandwidth of the access session to be controlled according to the requirement of the user. Therefore, the Internet access speed can be changed on-demand. The user is billed according to the usage of the service and no service level upgrades are required making the system highly economical.

Although the invention has been discussed with respect to specific embodiments thereof, these embodiments are merely illustrative, and not restrictive, of the invention. For example, a 'method for a method for managing bandwidth in a communication network via a TBS' can include any type of analysis, manual or automatic, to anticipate the needs of management of the bandwidth in a communication network.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the present invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims

What is claimed is:

1. A method for managing bandwidth in a communication network, the method comprising:
   a Residential Gateway (RG), establishing a communication session for a user between the user and a Service Provider (SP) using a Regional/Access Network (RAN) that facilitates communications between the RG and the SP;
   the RG, determining, without receiving any bandwidth category selection input from the user or from the SP, a selected bandwidth category of communication speed, from a plurality of different bandwidth categories, that needs to be provided to a user device to provide sufficient amount of bandwidth to the user device;
   wherein the plurality of different bandwidth categories comprises a default bandwidth category;
   wherein the selected bandwidth category is different than the default bandwidth category;
   the RG, requesting, without receiving, from the user, any signal to invoke a request for improved communication speed, the selected bandwidth category of communication speed for the user;
   the RG, querying the RAN, without receiving input from the user, for one or more options available for an access session connection between the user and the SP;
   the RG, selecting, without receiving input from the user, one of the options provided by the RAN;
   the RG, requesting the RAN to change a session bandwidth associated with the access session connection based on the selected option to the selected bandwidth category by making a request for a Turbo Button Service (TBS); and
   the RG, receiving, from the RAN, a new policy to support a faster communication speed for the access session connection based on the selected option;
   upon determining that the access session connection was terminated, the RG requesting, without receiving input from the user, the RAN to change the session bandwidth to the default bandwidth category and resetting the bandwidth to the default bandwidth category.

2. The method of claim 1, further comprising: establishing a Point-to-Point Protocol (PPP) access session for a user.

3. The method of claim 1 further comprising initiating a cancellation of an invocation of the request for the TBS.

4. The method of claim 3, wherein the cancellation of the invocation of the request for the TBS is initiated automatically after a pre-determined fixed time is over.

5. A system for managing bandwidth in a communication network, wherein the communication network comprises a Regional/Access Network (RAN), the system comprising:
   one or more computing devices;
   a Residential Gateway (RG);
   means, at the RG, for establishing a Point-to-Point Protocol (PPP) access session for a user;
   means, at the RG, for determining, without receiving any bandwidth category selection input from the user or from a service provider (SP), a selected bandwidth category of communication speed, from a plurality of different bandwidth categories, that needs to be provided to a user device to provide sufficient amount of bandwidth to the user device;
   wherein the plurality of different bandwidth categories comprises a default bandwidth category;
   wherein the selected bandwidth category is different than the default bandwidth category;
   means, at the RG, for, requesting, without receiving, from the user, a signal to invoke a request for improved communication speed, the selected bandwidth category of communication speed for the user;
   means, at the RG, for querying the RAN, without receiving input from the user, for options available for an access session connection;
   means, at the RG, for selecting, without receiving input from the user, one of the options;
   means, at the RG, for requesting the RAN to change the session bandwidth associated with the access session connection based on the selected option to the selected bandwidth category by making a request for a Turbo Button Service (TBS); and
   means, at the RG, for receiving a new policy from the RAN to support a new turbo speed for Internet access the new policy being based on the selected option;
   means, at the RG, for requesting, without receiving input from the user, the RAN to change the session bandwidth to the default bandwidth category and resetting the bandwidth to the default bandwidth category upon determining that the access session connection was terminated.

6. A system for managing bandwidth in a communication network, wherein the communication network comprises a Regional/Access Network (RAN), the system comprising:
   one or more computing devices;
   at a Residential Gateway (RG):

an establishing module for establishing a Point-to-Point Protocol (PPP) access session for a user;

a first requesting module for requesting, without receiving, from a user, a signal to invoke a request for improved communication speed, the improved communication speed for the user;

a querying module for querying the RAN, without receiving input from a user, for one or more options available for an access session connection;

a selecting module for selecting, without receiving any bandwidth category selection input from the user or from a service provider (SP), a selected bandwidth category of communication speed, from a plurality of different bandwidth categories, that needs to be provided to a user device to provide sufficient amount of bandwidth to the user device;

wherein the plurality of different bandwidth categories comprises a default bandwidth category;

wherein the selected bandwidth category is different than the default bandwidth category;

a second requesting module for requesting the RAN to change the session bandwidth associated with the access session connection based on the selected bandwidth category of communication speed to the selected bandwidth category by making a request for a Turbo Button Service (TBS); and an updating module for receiving a new policy from the RAN to support a new turbo speed for Internet access the new policy being based on the selected bandwidth category of communication speed, and for requesting, without receiving input from the user, the RAN to change the session bandwidth to the default bandwidth category and for resetting the bandwidth to the default bandwidth category.

7. The system of claim 6 further comprising a cancellation module initiating a cancellation of an invocation of a request for the TBS.

8. The system of claim 7, wherein the cancellation of the invocation of the request for the TBS is initiated automatically after a pre-determined fixed time.

9. A non-transitory machine-readable storage medium storing machine-executable instructions for managing bandwidth in a communication network, wherein the communication network comprises a Regional/Access Network (RAN), the medium comprising:

one or more instructions, executed by a Residential Gateway (RG), for establishing a Point-to-Point Protocol (PPP) access session for a user;

one or more instructions, executed by the RG, for requesting, without receiving, from the user, a signal to invoke a request for improved communication speed, the improved communication speed for the user;

one or more instructions, executed by the RG, for querying the RAN, without receiving input from the user, for one or more options available for an access session connection;

one or more instructions, executed by the RG, for selecting, without receiving any bandwidth category selection input from the user of from a service provider (SP), a selected bandwidth category of communication speed, from a plurality of different bandwidth categories, that needs to be provided to a user device to provide sufficient amount of bandwidth to the user device;

wherein the plurality of different bandwidth categories comprises a default bandwidth category;

wherein the selected bandwidth category is different than the default bandwidth category;

one or more instructions, executed by the RG, for requesting the RAN to change the session bandwidth associated with the access session connection based on the selected bandwidth category of communication speed by making a request for a Turbo Button Service (TBS); and one or more instructions, executed by the RG, for receiving a new policy from the RAN to support a new turbo speed for Internet access the new policy being based on the selected bandwidth category of communication speed;

one or more instructions, executed by the RG, for requesting, without receiving input from the user, the RAN to change the session bandwidth to the default bandwidth category and resetting the bandwidth to the default bandwidth category upon determining that the access session connection was terminated.

10. The machine-readable medium of claim 9, further comprising instructions, executed by the RG, for initiating a cancellation of an invocation of the request for the TBS.

11. The machine-readable medium of claim 9, further comprising instructions, executed by the RG, for initiating a cancellation of an invocation of a request for the TBS.

12. An apparatus for managing bandwidth in a communication network, wherein the communication network comprises a Regional/Access Network (RAN), the apparatus comprising:

a processing system including a processor coupled to a display and user input device; and a non-transitory machine-readable medium including instructions executable by the processor comprising:

a Residential gateway (RG);

one or more instructions, executed by the RG, for establishing a Point-to-Point Protocol (PPP) access session for a user;

one or more instructions, executed by the RG, for requesting, without receiving, from the user, a signal to invoke a request for improved communication speed, the improved communication speed for the user;

one or more instructions, executed by the RG, for querying the RAN, without receiving input from the user, one or more options available for an access session connection;

one or more instructions, executed by the RG, for selecting, without receiving any bandwidth category selection input from the user or a service provider (SP), a selected bandwidth category of communication speed, from a plurality of different bandwidth categories, that needs to be provided to a user device to provide sufficient amount of bandwidth to the user device;

wherein the plurality of different bandwidth categories comprises a default bandwidth category;

wherein the selected bandwidth category is different than the default bandwidth category;

one or more instructions, executed by the RG, for requesting the RAN to change the session bandwidth associated with the access session based on the selected bandwidth category of communication speed by making a request for a Turbo Button Service (TBS); and one or more instructions, executed by the RG, for receiving a new policy from the RAN to support a new turbo speed for Internet access the new policy being based on the selected bandwidth category of communication speed;

one or more instructions, executed by the RG, for requesting, without receiving input from the user, the RAN to change the session bandwidth to the default bandwidth category and resetting the bandwidth to the default bandwidth category upon determining that the access session connection was terminated.

* * * * *